(12) United States Patent
Hattori et al.

(10) Patent No.: US 6,568,520 B2
(45) Date of Patent: May 27, 2003

(54) ELECTROMAGNETIC CLUTCH AND COMPRESSOR EQUIPPED THEREWITH

(75) Inventors: Makoto Hattori, Nishi-kasugai-gun (JP); Ryuhei Tanigaki, Nishi-kasugai-gun (JP); Minoru Kawada, Nishi-kasugai-gun (JP); Kazuhiro Tomimasu, Nagoya (JP); Masumi Sekita, Nagoya (JP); Hirohide Ando, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/881,037

(22) Filed: Jun. 15, 2001

(65) Prior Publication Data

US 2002/0000355 A1 Jan. 3, 2002

(30) Foreign Application Priority Data

Jun. 30, 2000 (JP) .................................. 2000-199502
Jul. 19, 2000 (JP) .................................. 2000-219561

(51) Int. Cl.⁷ .............................................. F16D 27/00
(52) U.S. Cl. ............................... 192/84.961; 192/107 R
(58) Field of Search .......................... 192/84.961, 84.96, 192/107 R, 107 M; 335/209, 192; 188/161, 162, 164

(56) References Cited

U.S. PATENT DOCUMENTS

| | | | |
|---|---|---|---|
| 1,944,831 A | | 1/1934 | Whyte |
| 3,586,145 A | | 6/1971 | Cunningham, Jr. et al. |
| 5,138,293 A | * | 8/1992 | Ishimaru ..................... 335/289 |
| 5,372,228 A | * | 12/1994 | VanLaningham et al. ................... 192/84.941 |
| 5,667,050 A | * | 9/1997 | Hasegawa ............... 192/84.961 |
| 5,994,158 A | * | 11/1999 | Kashima et al. .......... 192/84.96 |

FOREIGN PATENT DOCUMENTS

| | | |
|---|---|---|
| CH | 278 088 | 9/1951 |
| EP | 0 836 026 | 4/1998 |
| FR | 897 948 | 4/1945 |
| JP | 6-42556 A * | 2/1994 |
| JP | 10-115333 | 5/1998 |

* cited by examiner

*Primary Examiner*—Saul Rodriguez
(74) *Attorney, Agent, or Firm*—Oblon, Spivak, McClelland, Maier & Neustadt, P.C.

(57) ABSTRACT

The present invention aims to provide an electromagnetic clutch capable of decreasing the impact noise generated when the armature plate and the driving rotor are coupled. The present invention further aims to provide a compressor equipped with this electromagnetic clutch.

An electromagnetic clutch in the present invention comprises a driving rotor including a coil, and an armature having an armature plate that is disposed facing this driving rotor and having the same axis of rotational thereas, and when a voltage is applied to excite coil, the end face of driving rotor and the armature plate are attached together by coil's magnetic force, thereby coupling driving rotor and armature. Armature plate comprises a plurality of metal thin plates (plate members) laminated together, and at least a part of the plate members being connected each other.

40 Claims, 10 Drawing Sheets

ELECTROMAGNETIC CLUTCH AND COMPRESSOR EQUIPPED THEREWITH

BACKGROUND OF THE INVENTION

1. Field of the Invention

The present invention relates to an electromagnetic clutch, and more preferably, to an electromagnetic clutch employed in a compressor that is assembled into an air conditioner in a vehicle or the like.

2. Description of the Related Art

FIG. 16 is a view in longitudinal section showing an example of a conventional electromagnetic clutch.

This electromagnetic clutch 100 is provided in a compressor, such as an air conditioner in a vehicle or the like. Electromagnetic clutch 100 mechanically and intermittently connects this compressor and a driving source not shown in the Figure. Electromagnetic clutch 100 is disposed in the nose portion 101 of the front case of the compressor.

A driving rotor 103 is supported in a freely rotating manner at the outer periphery of nose portion 101 via clutch shaft bearing 102. A coil 104 is included inside driving rotor 103. Armature plate 105 is coaxially disposed so as to be facing said driving rotor 103.

Hub 106 is fixed in place by a nut 107 to the projecting portion of drive shaft 112 of the compressor. One end of connecting plate 108 is fixed in place to this hub 106 by rivet 110, while the other end is fixed to armature plate 105 via rivet 109. Electromagnetic clutch 100 is composed of clutch shaft bearing 102, driving rotor 103, coil 104, armature plate 105, hub 106, connecting plate 108, and rivets 109 and 110 as main parts thereof.

A belt pulley 111 is provided at the outer periphery of driving rotor 103 and is connected to a driving source such as an engine via a V belt that is wrapped around belt pulley 111 but is not shown in the figures.

In an electromagnetic clutch 100 of this design, the driving rotor 103 is connected to a driving source such as an engine, so that it is constantly rotating when the driving source is rotating. When electricity is sent through coil 104 and excites it in this state, armature plate 105 attaches to driving rotor 103 as a result of the magnetic force of coil 104. A rotating torque of the driving source is communicated to drive shaft 111 via, in sequence, driving rotor 103, armature plate 105, rivet 109, connecting plate 108, rivet 110, and hub 106. Drive shaft 112 of the compressor element is rotated as a result.

In this state, when electricity ceases to be sent through coil 104, armature plate 105 separates from driving rotor 103, and the transmission of power to drive shaft 112 is interrupted.

In the electromagnetic clutch 100, the armature plate 105 is made of metal and is formed as a thick plate having a unitary structure. Driving rotor 103 is also formed as a unitary structure from a metal material. When electricity is passed through coil 104 and armature plate 105 is attached to driving rotor 103 due to the magnetic force of coil 104, armature plate 105 is coupled to driving rotor 103 at high speed so as to minimize the relative slipping time between armature plate 105 and the end face of driving rotor 103. For this reason, a problematic noise is generated when electricity is sent through coil 104, so that coil 104 is excited and the armature plate 105 makes contact with an end face of the driving rotor 103.

SUMMARY OF THE INVENTION

The present invention was conceived in view of the above-described problems, and has as its objective the provision of an electromagnetic clutch capable of decreasing the noise generated when the armature plate makes contact with the driving rotor. The present invention further aims to provide a compressor equipped with this electromagnetic clutch.

The electromagnetic clutch in the present invention comprises a driving rotor that is connected so as to be linked to a driving source and that includes a coil, and an armature having an armature plate that is disposed facing this driving rotor and having the same axis of rotational thereas, wherein, when a voltage is applied to excite the coil, the end face of the driving rotor and the armature plate are attached or separated by the coil's magnetic force, thereby intermittently coupling the driving rotor and the armature. In said electromagnetic clutch, the armature plate comprises a plurality of plate members laminated together, and at least a part of each of the plate members being connected the other plate members.

In this electromagnetic clutch, the armature plate is formed by laminating together a plurality of plate members. As a result, air layers are formed in between each of the plate members. For this reason, a force generated when the armature plate makes contact with the end face of the driving rotor is absorbed and reduced through the vibration of the individual plate members of the armature plate.

In addition, because the armature plate comprises a plurality of plate members laminated together, the armature plate is less rigid as compared to conventional armature plates which consist of a thick plate formed as a unitary structure. Thus, the force generated when the armature plate makes contact with the end face of the driving rotor is absorbed and reduced.

In the electromagnetic clutch, each of the plate members has the same thickness.

Because each of the plate members is of equal thickness in this electromagnetic clutch, numerous plate members can be formed easily. As a result, the cost of the armature plate is decreased.

In said electromagnetic clutch, among the various plate members, the plate member that comes in contact with the end face of the driving rotor is of a different thickness than the other plate members.

The magnetic force generated by the armature plate is controlled by on the thickness of the plate member that comes in contact with the driving rotor. Accordingly, when the thickness of the plate member that comes in contact with the end face of the driving rotor is increased in this electromagnetic clutch, the magnetic flux generated by the coil passes easily through the plate members. Thus, the magnetic force generated at the armature plate becomes greater, and, as a result, the clutch torque increases.

Conversely, if the plate that comes in contact with the end face of the driving rotor is made thinner, then the plate members are less rigid. Therefore, the force generated when the armature plate makes contact with the end face of the driving rotor is reduced.

In the electromagnetic clutch, among the plate members, the plate member that comes in contact with the end face of the driving rotor is thicker than the other plate members.

Because the plate member that comes in contact with the end face of the driving rotor is in sliding contact with the end face of the driving rotor, it experiences more severe abrasion than the other plate members. Accordingly, in this electromagnetic clutch, the plate member that comes in contact with the end face of the driving rotor is made thicker than the other plate members.

In the electromagnetic clutch, the various plate members forming the armature plate are roughly ring-shaped and made of a metal material, and are fixed in place by welding at a plurality of sites on the outer periphery, or on the outer and inner peripheries, of the plate members.

By suitably welding a plurality of sites on the outer periphery, or on the outer and inner peripheries, of the plate members, the various plate members are conveniently fixed in place.

In addition, in the electromagnetic clutch in the present invention, the various plate members forming the armature plate are roughly ring-shaped, and are fixed in place by caulking at a variety of sites on the end face of the plate members.

By employing caulking, it is possible to fix the plate members securely without carrying out a thermal treatment such as welding.

The electromagnetic clutch comprises a driving rotor, that includes a coil and is connected so as to be linked to a driving source, and an armature, that has an armature plate that is disposed so as to face the driving rotor and has the same axis of rotation thereas, and the end face of the driving rotor and the armature plate are attached together or are separated by the coil's magnetic force when the coil is excited due to voltage impression, thereby intermittently linking and connecting the driving rotor and the armature. In this electromagnetic clutch, the driving rotor has a main body portion formed in a unitary manner and a wall portion that forms the end face of the driving rotor, the wall portion comprises laminating a plurality of plate members, and at least a part of each of said plate members being connected to the other plate members.

The wall portion forming the end face of the driving rotor in this electromagnetic clutch is formed by laminating a plurality of plate members together. As a result, air layers are formed between each of the plate members, and a driving rotor end face is formed that has a low eigenvalue (spring constant). For this reason, the force generated when the end face of the driving rotor couples with the armature plate is absorbed and reduced due to the vibration of the individual plate members that form the wall portion on the end face side of the driving rotor.

In addition, the wall portion forming the end face of the driving rotor comprises a plurality of plate members laminated together. Thus, the driving rotor end face is less rigid than a conventional driving rotor end face that is formed to have a unitary structure. Thus, the force generated when the armature plate makes contact with the end face of the driving rotor is reduced.

In the electromagnetic clutch, each of the plate members has the same thickness.

By forming each of the plate members to have the same thickness in this electromagnetic clutch, a plurality of plate members can be easily formed. Thus, the cost of the driving rotor can be reduced.

In the electromagnetic clutch, among the plate members, the plate member that comes in contact with the armature plate is thicker than the other plate members.

The plate member that comes in contact with the armature plate is in sliding contact with the armature plate, so that it experiences more severe abrasion as compared to the other plate members. According, in this electromagnetic clutch, the plate member that comes in contact with the armature plate is thicker than the other plate members.

Further, in the present invention, each of the plate members is roughly ring-shaped and is formed of a metal material, and welding is performed to a plurality of sites on the outer periphery of the plate members or caulking is performed to outer peripheral sites on the end face of each of the plate members to fix the plate members to the outer peripheral side of the main body portion; and/or welding is performed to a plurality of sites on the inner periphery of the plate members or caulking is performed at inner peripheral sites on the end face of each of the plate members to fix the plate members to the inner peripheral side of the main body portion.

By welding or caulking on the outer peripheral side and/or the inner peripheral side of the plate members, each of the plate members can be conveniently fixed in place to the main body portion of the driving rotor.

In addition, in the present invention, the provision of the above-described armature plate and driving rotor.

In present invention, in a compressor for compressing a fluid using a compressor element, the power from the driving source that is mechanically connected to the driving rotor via the above-described electromagnetic clutch is communicated to the drive shaft of the compressor element that is mechanically connected to the armature.

DETAILED DESCRIPTION OF THE INVENTION

The first embodiment of the present invention will now be explained with reference to the accompanying figures. Note, however, that the present invention is not limited to these embodiments.

Figure 1:
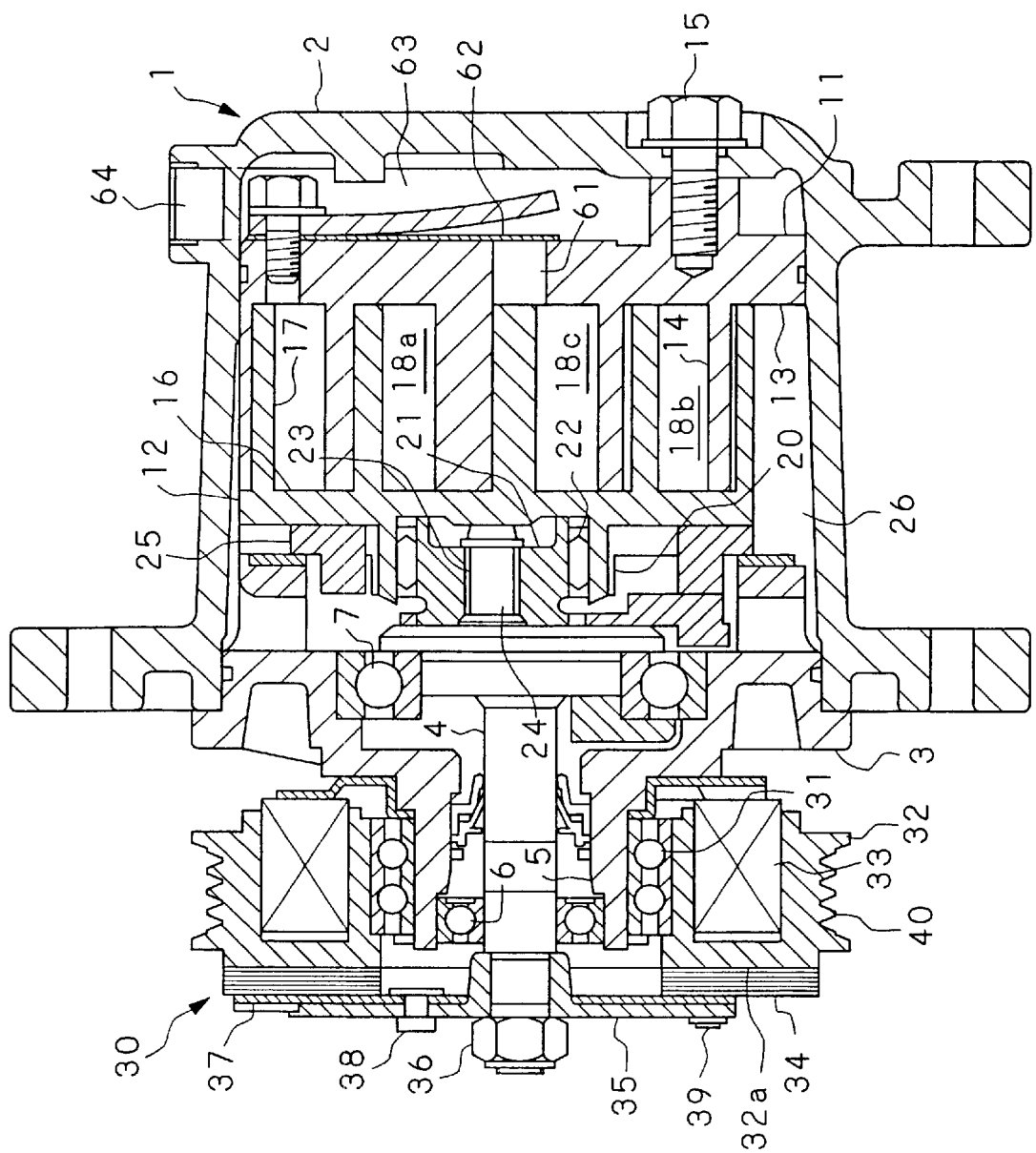
FIG. 1 is a sectional view showing an embodiment of the compressor according to a first embodiment of the present invention.

FIG. 1 is a view in longitudinal section showing an embodiment of a compressor according to the present invention.

In the compressor shown in FIG. 1, numeral 1 indicates a housing consisting of a cup-shaped main body 2 and a front case 3 fastened by a bolt not shown in the figure.

A scroll compressor element consisting of a fixed scroll 11 and a revolving scroll 12 is disposed inside cup-shaped main body 2.

Fixed scroll 11 is provided with an end plate 13 and a spiral lap 14 that is provided projecting out from the inner surface of end plate 13. End plate 13 is fastened to cup-shaped main body 2 by bolt 15. Revolving scroll 12 is provided with end plate 16 and a spiral lap 17 that is provided projecting out from the inner surface of end plate 16. The axes of the evolving scroll 12 and fixed scroll 11 are eccentrically separated from each other by a radius of revolving, that is, they are in an eccentric form. In addition, phases of these scrolls are different from each other by 180°, and these scrolls are engaged with each other. As a result, a plurality of closed small chambers 18a, 18b are formed essentially at positions of point symmetry with respect to the center of the spiral.

Drive bush 21 is included so as to be freely rotating via revolving bearing 22 inside a cylindrical boss 20 which projects from the middle of the outer surface of end plate 16. An eccentric drive pin 24, which is provided projecting from the inner end of drive shaft 4, engages in a freely rotating manner with eccentric hole 23 which is provided penetrating through this drive bush 21. This drive shaft 4 projects to the outside passing through nose portion 5 of front case 3, and is supported by front case 3 via shaft bearings 6 and 7.

As shown in the figure, driving rotor 32 is supported in a freely rotating manner via a clutch shaft bearing 31 at the outer periphery of nose portion 5 of front case 3. A coil 33 held in place by nose portion 5 via a fixing member is included in driving rotor 32. In other words, driving rotor 32 is provided so as to be freely rotating with respect to coil 33 which is fixed in place. An armature plate 34 having the same axis is disposed facing this driving rotor 32.

Hub 35 is fixed in place by nut 36 to the projecting portion of drive shaft 4 of this compressor. One end of connecting plate 37 is fixed in place to hub 35 by rivet 38, and the other end of connecting plate 37 is fixed in place to armature plate 34 via rivet 39.

Electromagnetic clutch 30 is composed of a clutch shaft bearing 31, a driving rotor 32, coil 33, armature plate 34, hub 35, connecting plate 37, and rivets 38 and 39 as main components thereof. An armature is formed of armature plate 34, hub 35, connecting plate 37, and rivets 38, 39.

A belt pulley 40 is provided to the outer periphery of driving rotor 32, and is connected to a driving source such as an engine via a V-belt, not shown in the figures, which is wrapped around belt pulley 40.

The compressor operates as follows.

Driving rotor 32 is connected to a driving source such as an engine via the V-belt. As a result, driving rotor 32 is constantly turning during the rotation of the engine or other such driving source. In this state, electricity is sent through coil 33, exciting it. As a result, armature plate 34 attaches to end face 32a of driving rotor 32 due to the magnetic force of coil 33. The rotation of driving rotor 32 is communicated by drive shaft 4 to armature plate 34, rivet 39, connecting plate 37, rivet 38, and hub 35 in sequence. Drive shaft 4 in this compressor mechanism is rotated.

When the transmission of electricity through coil 33 stops, armature 34 moves away from driving rotor 32 and transmission of power to drive shaft 4 is interrupted.

Drive shaft 4 is rotated, so that revolving scroll 12 is driven via eccentric drive pin 24, drive bushing 21, revolving bearing 22, and boss 20, and revolving scroll 12 is revolved and turned along a circular orbit, with auto-turning thereof prevented by rotation-blocking mechanism 25.

A line-contact portion between spiral laps 14 and 17 are gradually moved toward the center of "swirl". And thereby, the closed small chambers 18a and 18b also move toward the center of the swirl while the volume of each chamber is gradually reduced. Accordingly, gas, which flows into suction chamber 26 via an inlet port not shown in the figures is trapped inside closed small chambers 18a and 18b from the opening at the outer peripheral end between spiral laps 14 and 17, and reaches small chamber 18c in the center while being compressed. The gas then passes through discharge port 61 which is provided penetrating through end plate 13 of fixed scroll 11, pushes open discharge valve 62, is discharged to discharge cavity 63, and then flows out from here through discharge port 64.

Next, an explanation of the electromagnetic clutch which is the characteristic portion of the present invention in a compressor of the above-described design will be explained with reference to FIGS. 2 to 4.

Figure 2:
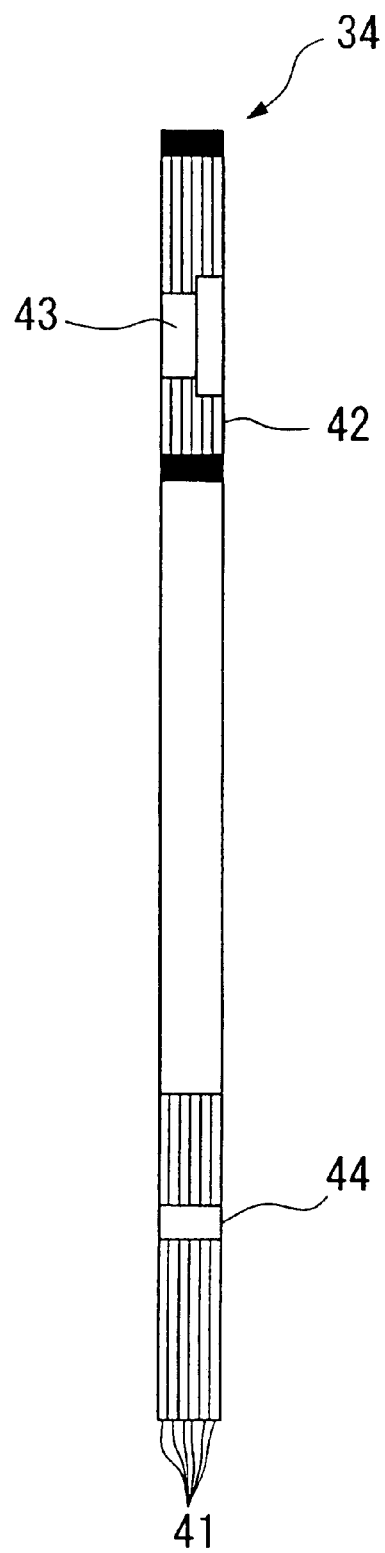
FIG. 2 is a lateral view of the armature plate shown in FIG. 1.

FIG. 2 is a lateral view of the armature plate that forms the electromagnetic clutch. Armature plate 34 is formed by laminating a plurality of metal thin plates 41 which have a thickness on the order of 0.3 to 1.0 mm, for example. These metal thin plates 41 constitute a magnetic member employing, for example, S12, S15, S17, or SPCC (SPCC-E supplied by Nippon Steel Corp. may also be used). In addition, of these metal thin plates 41, the metal thin plate that comes in contact with the end face of the driving rotor (i.e., the metal thin plate on the right side of the figure) will be referred to as friction plate 42.

In this way, armature plate 34 is formed by laminating a plurality of metal thin plates 41 and then laminating friction plate 42 to the side that comes in contact with the driving rotor end face.

Figure 3:
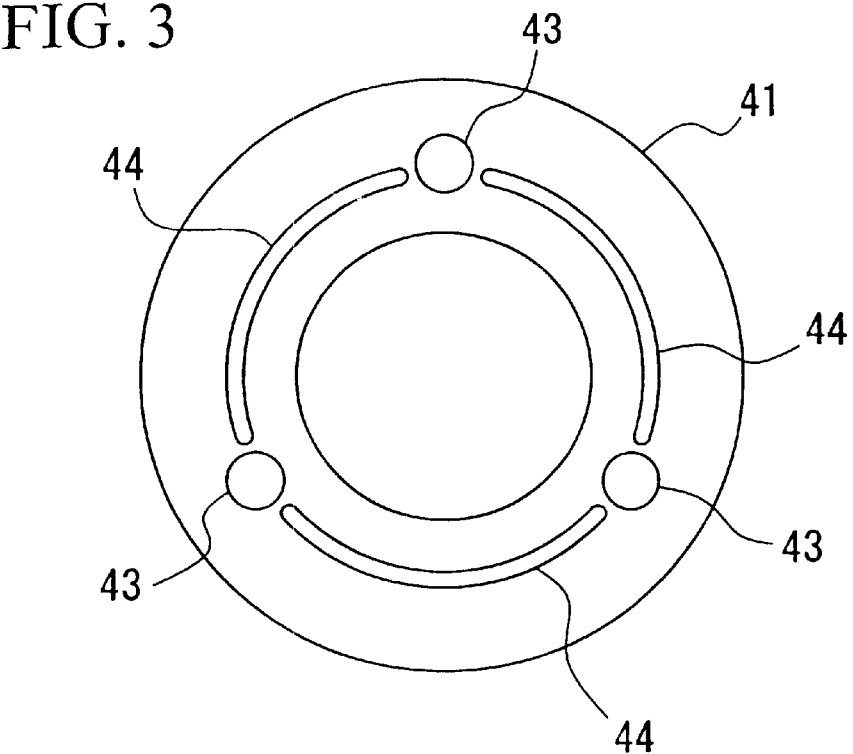
FIG. 3 is a plan view of the metal thin plate forming the armature plate in FIG. 2.

FIG. 3 is a plan view of a metal thin plate 41.

Metal thin plate 41 is ring-shaped with a hollow center. Holes 43 for connecting with a connecting plate are provided on the same circumference at three sites that are at equivalent angles with respect to one another. In addition, respective long holes 44 are provided in between each connecting hole 43 and on the same circumference as connecting holes 43.

Figure 4:
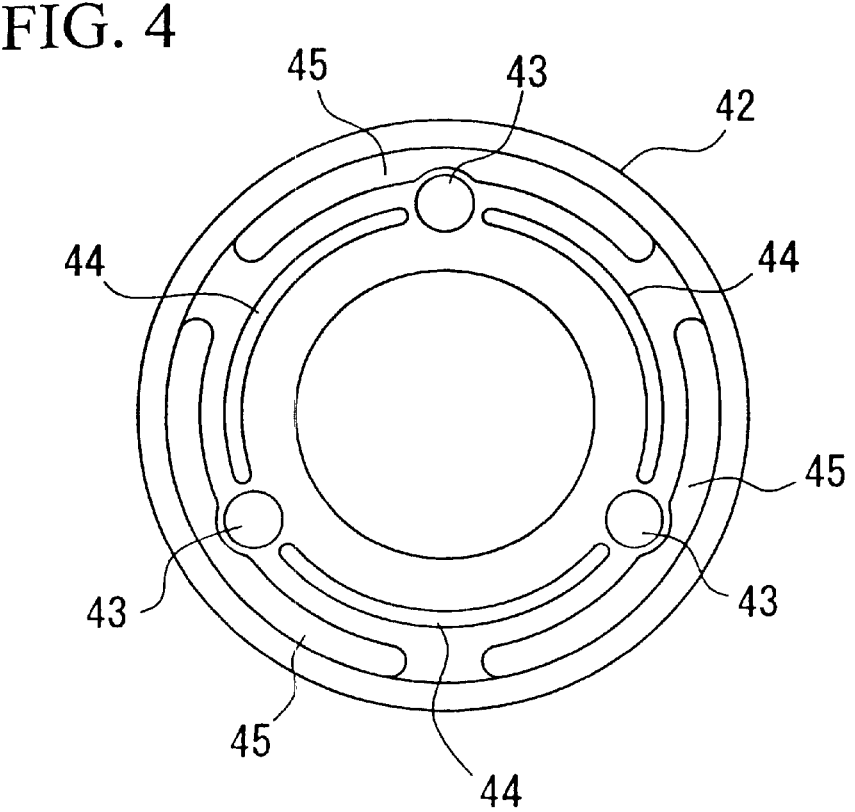
FIG. 4 is a plan view of the friction plate forming the armature plate in FIG. 2.

FIG. 4 is a plan view of friction plate 42 which is the plate from among the metal thin plates 41 forming armature plate 34 that comes in contact with the end face of the driving rotor.

Friction plate 42 is designed such that concavities 45 are formed in the aforementioned metal thin plates 41. With the exception of connecting holes 43, long holes 44, and concavities 45, the remainder of friction plate 42 serves as the friction surface that is in contact with the end face of the driving rotor.

Figure 5:
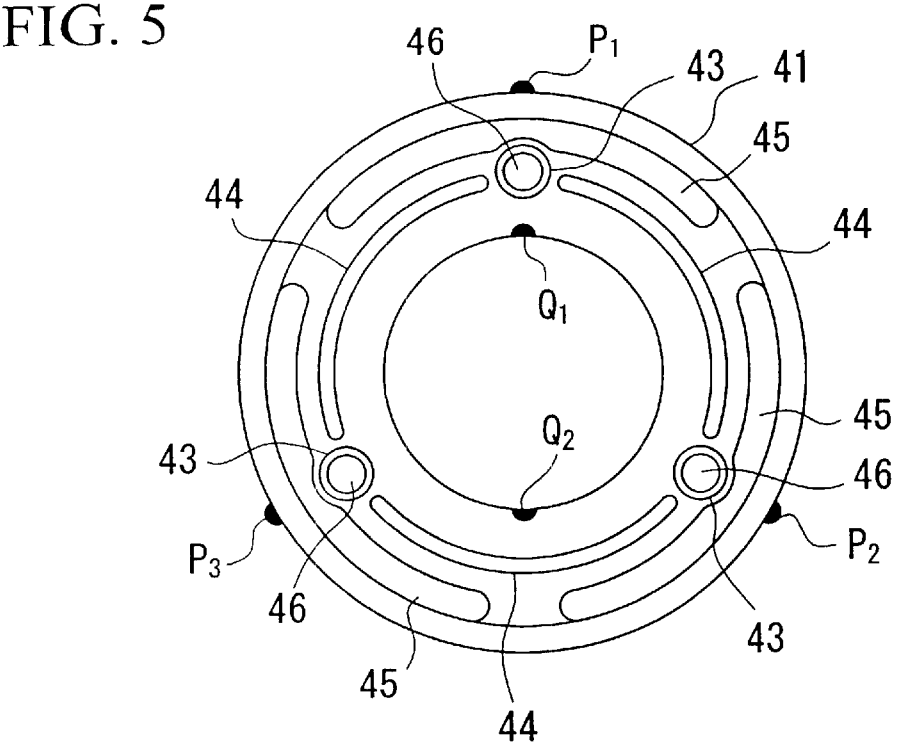
FIG. 5 is a plan view of the metal thin plate showing the means for fixing each of the metal thin plates shown in FIG. 3.

Armature plate 34 is fixed in place by laminating together friction plate 42 and a plurality of metal thin plates 41 shaped as described above, and then performing welding at multiple sites (three in this embodiment) P1, P2, and P3 on the outer periphery of the metal thin plates and at multiple sites (two in this embodiment) Q1 and Q2 on the inner periphery of the metal thin plates as shown in FIG. 5. The degree of welding is considered sufficient provided that the various metal thin plates 41 do not separate when the clutch torque is applied. By fixing armature plate 34 in this way, an air layer is formed in between each of the metal thin plates 41.

This armature plate 34 is fixed to connecting plate 37 by a bolt 46.

By forming armature plate 34 as described above, an air layer is formed in between each of the metal thin plates 41. As a result, the impact which occurs when armature plate 34 couples with the end face of the driving rotor is attached and decreased due to the vibration of the various individual metal thin plates 41 that form armature plate 34.

In addition, armature plate 34 is formed by laminating a plurality of metal thin plates 41, so that the rigidity of armature plate 34 is less than the rigidity of conventional armature plates formed as a thick unitary structure. Thus, the force generated when armature plate 34 and the end of the driving rotor couple is absorbed and reduced.

Thus, the force generated when armature plate 34 makes contact with end face 32a of driving rotor 32 couple is decreased in said electromagnetic clutch 30, and the noise generated when the armature plate 34 makes contact with the end face 32 is reduced. It is therefore possible to realize a compressor clutch and compressor in which there is little noise.

Figure 6:
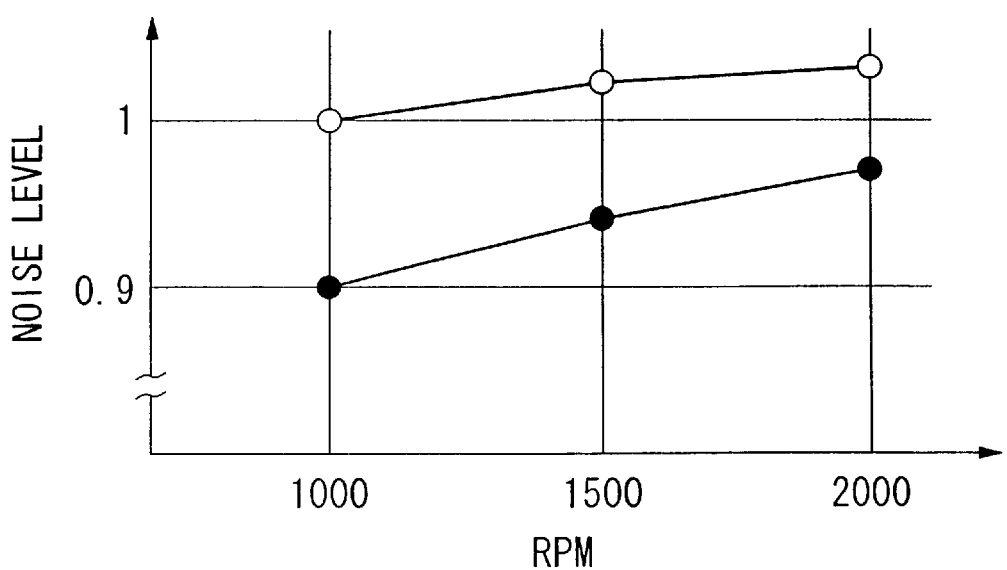
FIG. 6 is a view showing the level of noise generated when the armature plate and the driving rotor end face couple through a comparison with the conventional design.

FIG. 6 shows the level of noise generated when the armature plate and the end face of the driving rotor couple. In this figures, the line indicated by the black circles shows the noise level where employing an armature plate formed by laminating together metal thin plates. The line indicated by the white circles shows the noise level when employing a conventional armature consisting of a thick plate formed in a unitary manner. According to this figure, if the noise level generated by the conventional armature plate is defined to be 1 at an rpm of 1000, a armature plate formed by metal thin plates laminated together is around 0.9. The noise level is decreased by about 10%. In this way, it was possible to confirm that said armature plate formed by metal thin plates laminated together is effective in reducing the noise generated by the armature plate.

Figure 7:
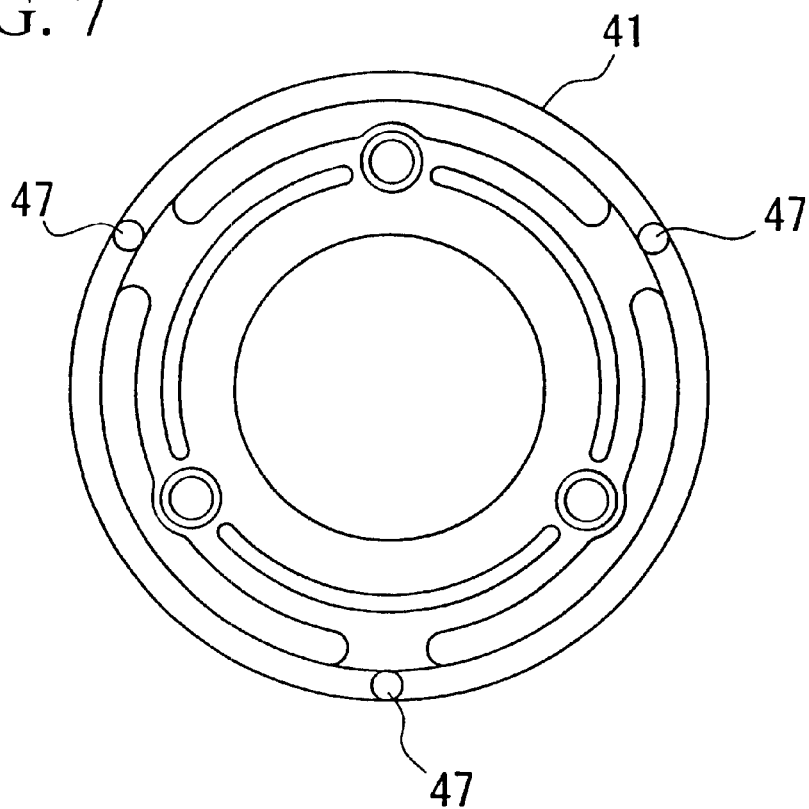
FIG. 7 is a plan view of the metal thin plates shown as a modification of the means for fixing each of the metal thin plates shown in FIG. 5.

Note that the first embodiment employed as the means for fixing in place the plurality of metal thin plates 41 a design in which welding was performed at a plurality of sites on the outer and inner peripheries of the metal thin plates 41 as shown in FIG. 5. However, the same actions and effects can be realized for a design in which caulking 47 is performed to a plurality of sites on the end face of metal thin plates 41 to fix a plurality of the metal thin plates in place as shown in FIG. 7.

Figure 8:
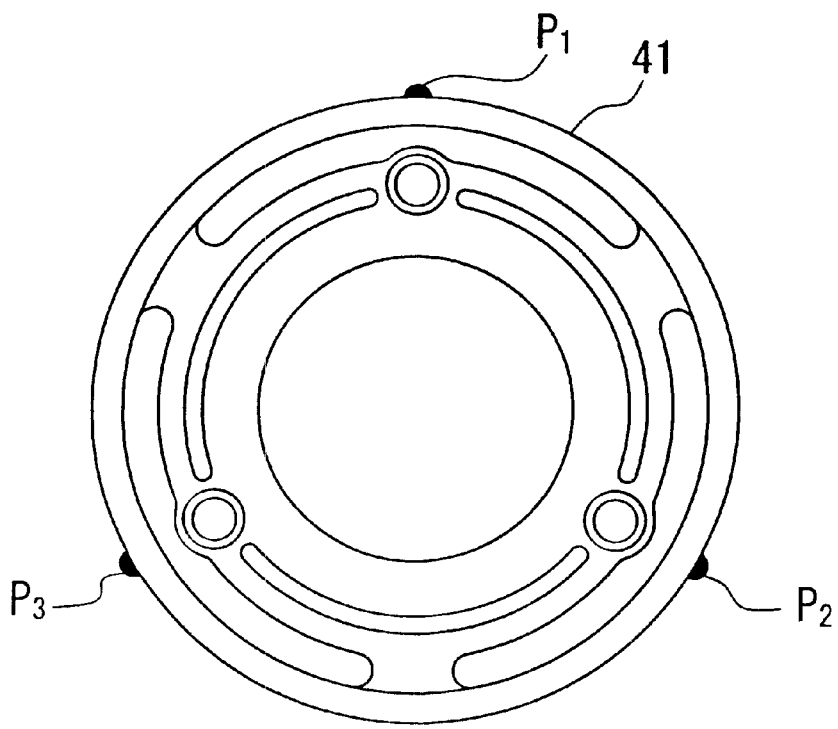
FIG. 8 is a plan view of the metal thin plates shown as a modification of the means for fixing each of the metal thin plates shown in FIG. 5.
Figure 9:
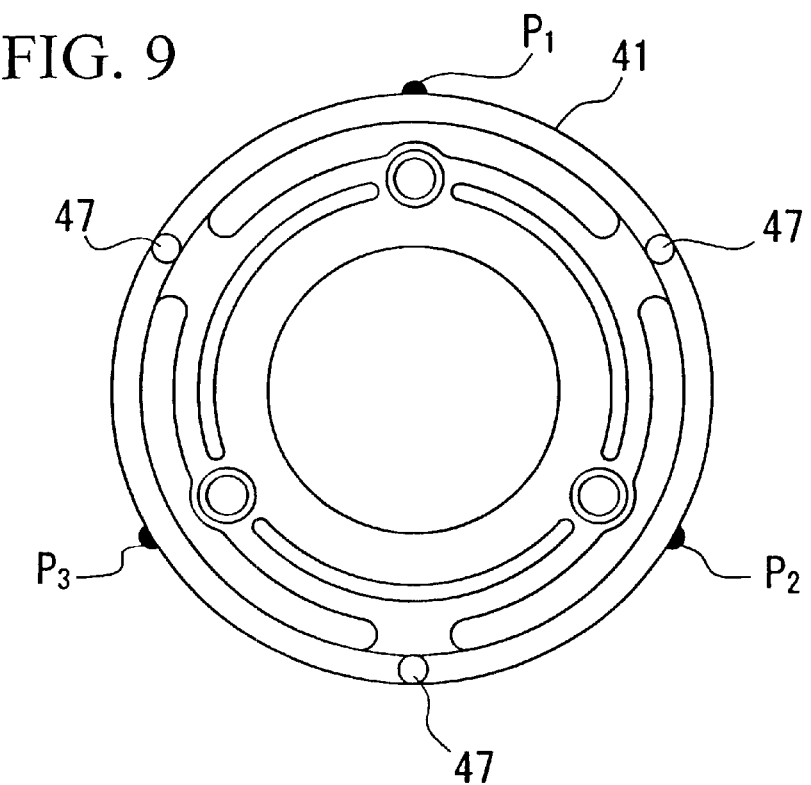
FIG. 9 is a plan view of the metal thin plates shown as a modification of the means for fixing each of the metal thin plates shown in FIG. 5.
Figure 10:
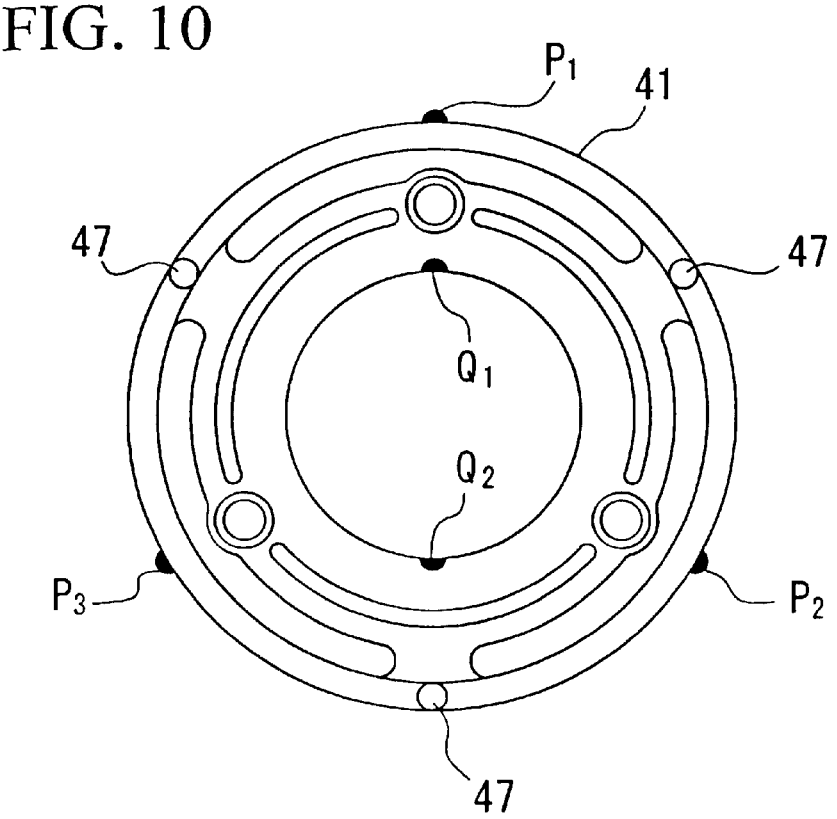
FIG. 10 is a plan view of the metal thin plates shown as a modification of the means for fixing each of the metal thin plates shown in FIG. 5.

Moreover, the same actions and effects are realized in the case of a design in which fixing is performed by welding only at a plurality of sites P1, P2, and P3 on the outer periphery of metal thin plates 41 as shown in FIG. 8; a design in which fixing is performed by welding at a plurality of sites P1, P2, and P3 on the outer periphery of metal thin plates 41 and performing caulking 47 to a plurality of sites on the end face of metal thin plates 41 as shown in FIG. 9; and a design in which fixing is performed by welding at a plurality of sites P1, P2, and P3 on the outer periphery and at a plurality of sites Q1 and Q2 on the inner periphery of metal thin plates 41, and performing caulking 47 to a plurality of sites on the end face of metal thin plates 41 as shown in FIG. 10.

In other words, the means for fixing the plurality of metal thin plates is not particularly restricted in the present invention. Rather, the means employed is acceptable provided there is fixing in place to a sufficient degree such that the various metal thin plates 41 do not separate when a clutch torque is applied. Similarly, the welding site, the number of welding spots, the caulking site, and the number of caulking spots for fixing metal thin plates 41 in place may be selected as appropriate.

In the first embodiment, the friction plate has the same thickness as the other metal thin plates. However, it is also acceptable to vary the thickness of the friction plate as appropriate for the design considerations.

The armature place is made less rigid if the friction plate is made thinner. As a result, there is a reduction in the force generated when the armature plate and the driving rotor end face couple.

Figure 11:
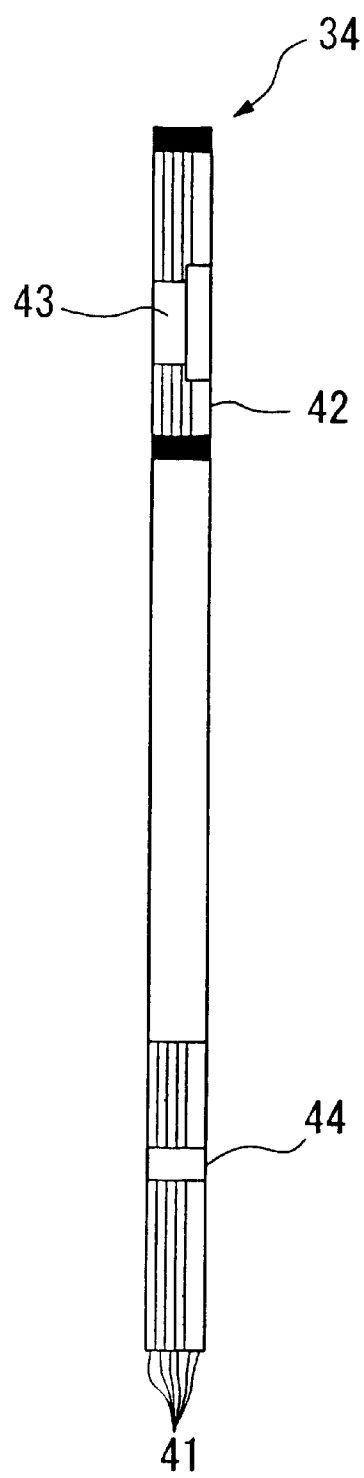
FIG. 11 is a side view showing a modification of the armature plate shown in FIG. 2.

Conversely, the magnetic force generated by the armature plate is controlled by the thickness of the friction plate that comes in contact with the driving rotor. Accordingly, when the thickness of the friction plate is increased, the magnetic flux generated by the coil passes easily through the friction plate. Thus, the magnetic force generated at the armature plate becomes greater, and, as a result, the clutch torque increases. In addition, when the friction plate comes in contact with the driving rotor end face, it contacts the end face while sliding, so that hardly any abrading occurs. Accordingly, by making friction plate 42a thicker than the other metal thin plates 41 as shown in FIG. 11, it is possible to prevent damage to the armature plate and friction plate from abrasion. In this case, the thickness of the friction plate is preferably 0.5 mm or more greater than the other metal thin plates.

Accordingly, the thickness of the friction plate can be set according to the aforementioned considerations.

In addition, in the present embodiment, the metal thin plates and friction plate constitute a magnetic member employing, for example, S12, S15, S17, or SPCC (SPCC-E supplied by Nippon Steel Corp. may also be used). In addition, however, it is also acceptable to increase the clutch torque by employing such strong magnetic members as magnetic steel plate 50A1300, 50A1000 and the like.

The second embodiment of the present invention will now be explained with reference to FIGS. 12 and 13.

Figure 16:
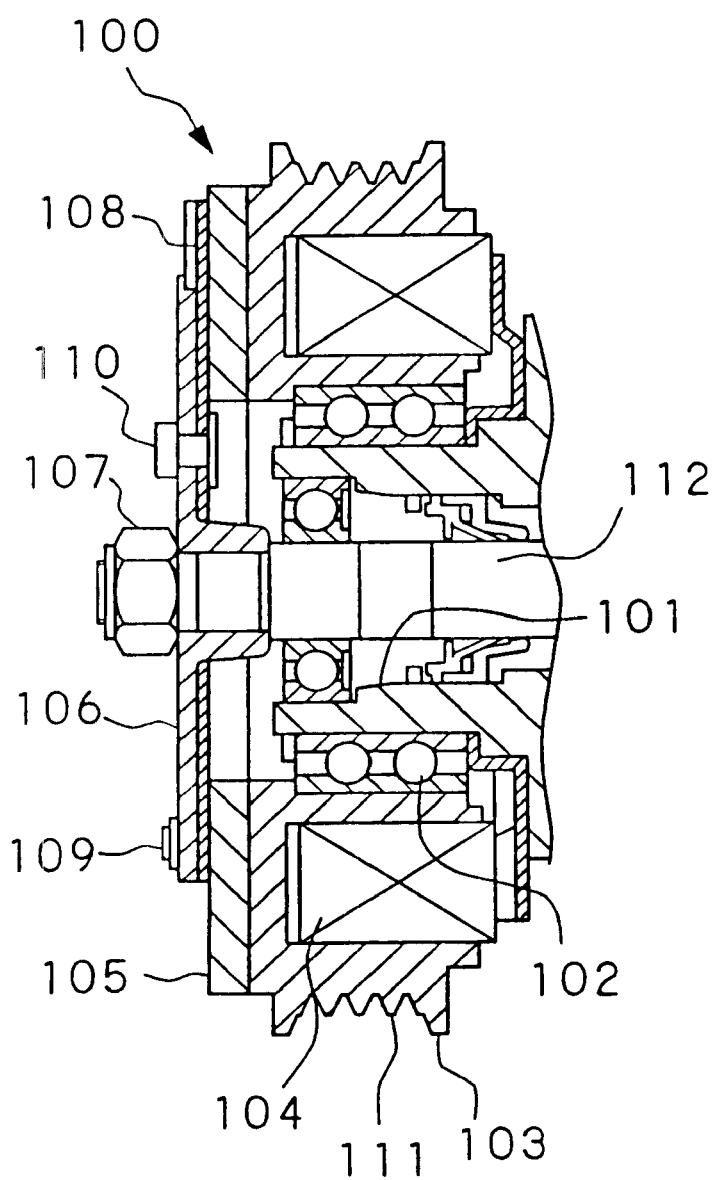
FIG. 16 is a sectional view showing an example of a conventional electromagnetic clutch.

This embodiment differs from the first embodiment in that the wall portion forming the driving rotor end plate is formed by laminating metal thin plates. The armature 105 as shown in FIG. 16, or armature plate 34 as shown in FIG. 2 from the first embodiment may be used for this armature plate.

Figure 12:
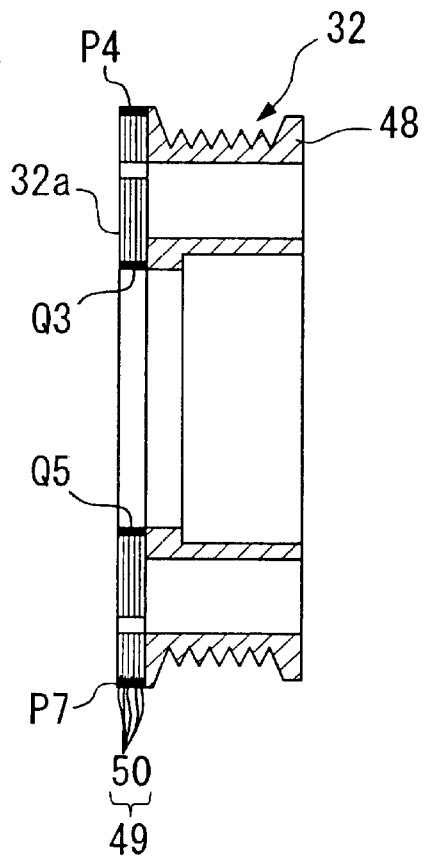
FIG. 12 is a side view of the driving rotor according to a second embodiment of the present invention.

FIG. 12 is a lateral view of the driving rotor that forms the electromagnetic clutch. Driving rotor 32 has a main body portion 48 which is formed in a unitary manner and a wall portion 49 forming the end face. Wall portion 49 is formed by laminating a plurality of metal thin plates 50 which have a thickness on the order of 0.3 to 1.0 mm. These metal thin plates 50 constitute a magnetic member employing, for example, S12, S15, S17, or SPCC (SPCC-E supplied by Nippon Steel Corp. may also be used).

Figure 13:
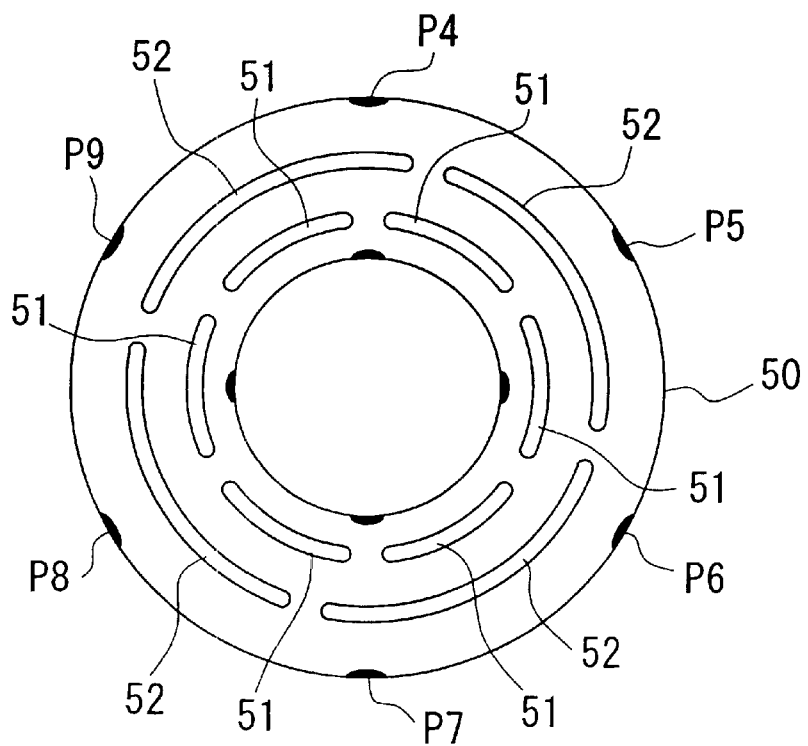
FIG. 13 is a plan view of the metal thin plates forming the wall portion on the end face side of the driving rotor in FIG. 12, and is a view showing the means for fixing in place each of the metal thin plates.

FIG. 13 is a plan view of a metal thin plate 50.

Metal thin plate 50 is ring-shaped with a hollow center. Long holes 51 and 52 are provided intermittently over each circumferences of concentric circles with the metal thin plate 50.

In driving rotor 32, metal thin plates 50 are laminated together, and welding is performed at a plurality of sites (6 in this embodiment) P4, P5, P6, P7, P8 and P9 on the outer periphery and at a plurality of sites (4 in this embodiment) Q3, Q4, Q5 and Q6 on the inner periphery of the metal thin plates as shown in FIG. 13, to form a unitary structure with main body portion 48. The degree of welding is considered sufficient provided that the various metal thin plates 50 do not separate when a clutch torque is applied. By fixing in this way, an air layer is formed in between each of metal thin plates 50.

In said driving rotor 32, an air layers are formed in between each of the metal thin plates 50, and an end face 32a of driving rotor 32 is formed that has a low eigenvalue (spring constant). For this reason, the force generated when the end face 32a of driving rotor 32 couples with the armature plate is reduced through the vibration of the individual metal thin plates 50 that form the wall portion on the end face 32a side of the driving rotor.

In addition, end face 32a of driving rotor 32 is less rigid than the end face of the driving rotor in conventional designs that consist of a unitary structure. Thus, there is a reduction in the force generated when the armature plate and the end face 32a of the driving rotor 32 couple.

Thus, the force generated when the armature plate and end face 32a of driving rotor 32 couple is decreased in said electromagnetic clutch 30, enabling a reduction in the noise generated when the armature plate makes contact with the end face 32a of driving rotor 32. It is therefore possible to realize a compressor clutch and compressor in which there is little noise.

Figure 14:
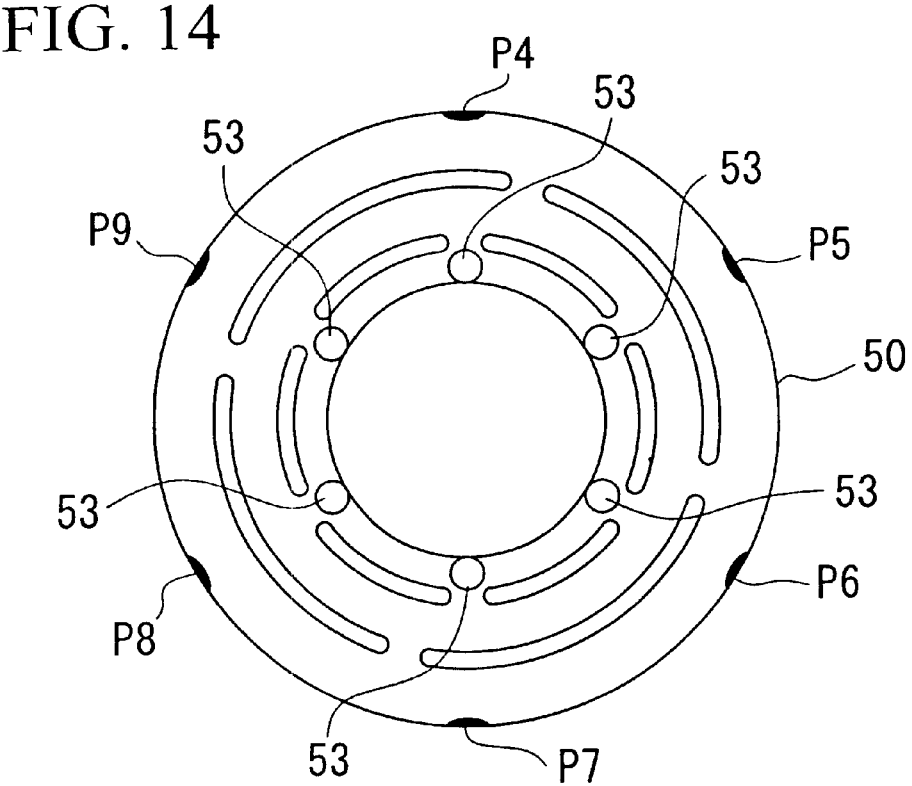
FIG. 14 is a plan view of the metal thin plates shown as a modification of the means for fixing each of the thin metal plates shown in FIG. 13.
Figure 15:
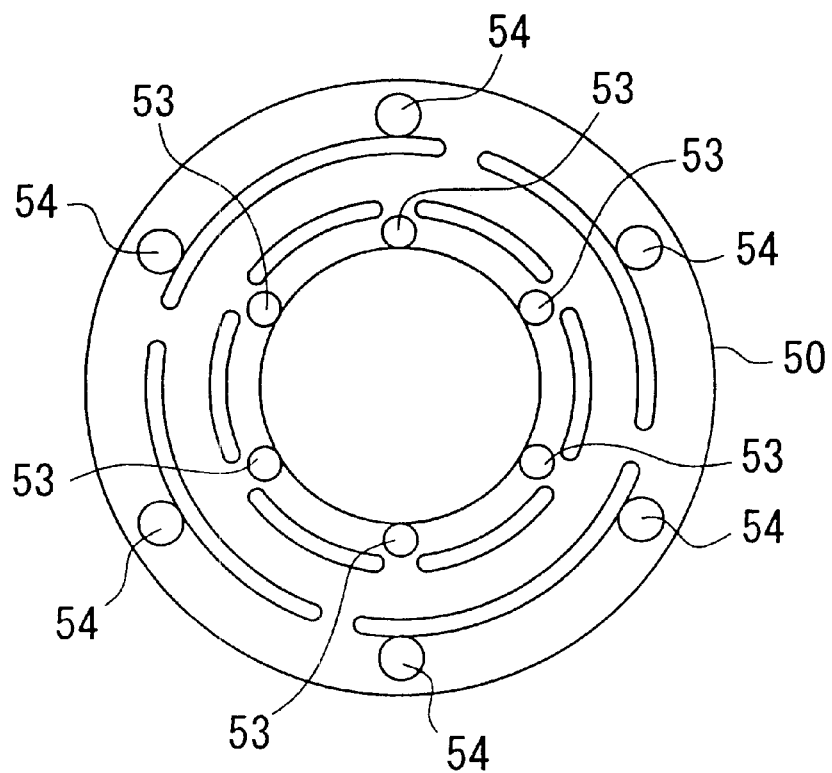
FIG. 15 is a plan view of the metal thin plates shown as a modification of the means for fixing each of the thin metal plates shown in FIG. 13.

Note that the second embodiment employed as the means for fixing the plurality of metal thin plates 50 to a main body portion 48 a design in which welding was performed to a plurality of sites on the outer and inner peripheries of the metal thin plates 50 as shown in FIG. 13. However, the same actions and effects can be realized for a design in which the metal thin plates are fixed to main body portion 48 by performing welding at a plurality of sites P4 to P9 on the outer periphery of metal thin plates 50 and performing caulking 53 at sites on the inner periphery of metal thin plates 50 as shown in FIG. 14; a design in which the metal thin plates are fixed to main body portion 48 by performing caulking 53 and 54 at the inner and outer peripheries of metal thin plates 50 as shown in FIG. 15; and a design in which the metal thin plates are fixed to the main body portion by performing caulking to sites on the outer periphery of the metal thin plates and performing welding to a plurality of sites on the inner periphery of the metal thin plates.

In other words, the means for fixing the plurality of metal thin plates 50 is not particularly restricted in the present invention. Rather, the means employed is acceptable provided there is fixing in place to a sufficient degree such that each of the metal thin plates 50 does not separate when the clutch torque is applied. It is also acceptable to fix metal thin plates 50 on their inner peripheral side or their outer peripheral side only. Similarly, the welding site, the number of welding spots, the caulking site, and the number of caulking spots for fixing metal thin plates 50 to main body portion 48 may be selected as appropriate.

In the second embodiment, the wall portion forming the end face of the driving rotor is formed by laminating together metal thin plates which are of equal thickness. However, it is also acceptable to form this wall portion by laminating together metal thin plates which have different thicknesses. When the driving rotor end face comes in contact with the armature plate, the armature plate contacts the end face of the driving rotor while sliding. Thus, the metal thin plate that comes in contact with the armature plate is scarcely abraded. According, by making the metal thin plate that comes in contact with the armature plate thicker that the other plate members, it is possible to prevent damage to the end face of the driving rotor by abrasion. In this case, the thickness of the metal thin plate that comes in contact with the armature plate is preferably 0.5 mm or more greater than the other metal thin plates.

In this embodiment, S12, S15, S17, or SPCC (SPCC-E supplied by Nippon Steel Corp. may also be used) was used for the metal thin plates, however, the material for the plates is not limited thereto.

Note that it is also acceptable to employ an electromagnetic clutch equipped with the armature plate disclosed in the first embodiment and the driving rotor disclosed in the second embodiment as modifications for the first and second embodiments.

The preceding embodiments described a scroll compressor, however the present invention is not limited thereto. It is also acceptable to employ other compressors such as a rotary compressor or a reciprocating compressor for example.

Further, these embodiments explained the case where the end face of the driving rotor and the armature plate were attached due to the magnetic force of the coil when the coil was excited by the impression of a voltage. However, the present invention also includes the case where the driving rotor end face and the armature plate are separated by the coil's magnetic force.

In the electromagnetic clutch of the present invention, the force generated when the armature plate is coupled with the end face of the driving rotor is reduced through the vibration of the individual plate members forming the armature plate. As a result, it is possible to reduce the noise of the contact between the armature plate and the driving rotor end face.

In addition, because the armature plate is less rigid as compared to conventional armature plates which consist of a thick plate formed as a unitary structure, the force generated when the armature plate and the end face of the driving rotor couple is reduced. The noise of the contact between the armature plate and the driving rotor end face can therefore be decreased.

By forming the plate members of the armature plate to have the same thickness in the above-described electromagnetic clutch, numerous plate members can be formed easily. As a result, the cost of the armature plate is decreased, and the cost of the electromagnetic clutch can be reduced.

Because the thickness of the plate member that comes in contact with the end face of the driving rotor from among the various plate members of said armature plate can be optionally varied, it is possible to realize an electromagnetic clutch according to a purpose of the electromagnetic clutch.

By making the plate member that comes in contact with the end face of the driving rotor thicker than the other plate members in this armature plate, it is possible to prevent damage to the armature plate from abrasion when contacting the end face of the driving rotor.

By forming each of the plate members to be roughly ring-shaped and made of metal, and welding at the outer or inner periphery of the plate member, it is possible to easily fix each of the plate members in place.

By performing a caulking operation on the end face of the plate member, the plate members can be fixed in place with confidence without carrying out a heat treatment. Thus, concerns about the effects of heat stress can be eliminated.

By providing the rotor in the present invention's electromagnetic clutch with the design described above, the force generated when the armature plate and the end face of the driving rotor couple is absorbed and by the vibration of the individual plate members forming the wall portion on the end face side of the driving rotor. Thus, the noise of the impact between the armature plate and the driving rotor can be reduced.

In addition, because the driving rotor end face is less rigid as compared to the conventional driving rotor end face which consists of a unitary structure, the force generated when the armature plate and the end face of the driving rotor couple is reduced. The noise generated when the armature plate contacts with the driving rotor end face can be decreased.

By forming the plate members of the rotor to have the same thickness, numerous plate members can be formed easily. As a result, the cost of the driving rotor is decreased, and the cost of the electromagnetic clutch can be reduced.

By making the plate member of the rotor that comes in contact with the armature plate thicker than the other plates, it is possible to prevent damage to the end face of the driving rotor from abrasion during contact with the armature plate.

By performing welding or caulking at the outer periphery and/or the inner periphery of the rotor plate members, it is possible to easily fix the various plate members to the main body portion of the driving rotor.

By employing an electromagnetic clutch provided with said armature plate and a rotor, a compressor with little noise can be realized.

What is claimed is:

1. An electromagnetic clutch comprising an armature that has a driving rotor, which is connected so as to be linked to a driving source and which includes a coil, and an armature plate, which is disposed so as to face said driving rotor and which has the same rotational axis thereas, and an end face of said driving rotor and said armature plate are attached or separated by said coil's magnetic force when a voltage is applied to excite said coil thereby intermittently coupling said driving rotor and said armature, wherein said armature plate comprises a plurality of plate members laminated together, and at least a part of each of said plate member being connected to the other plate members, wherein said plate members forming said armature plate are roughly ring-shaped, and are fixed in place by caulking at a plurality of sites on the end face of said plate members.

2. The electromagnetic clutch according to claim 1, wherein each said plate member has the same thickness.

3. The electromagnetic clutch according to claim 1, wherein from among said plate members, the plate member that contacts the end face of said driving rotor has a different plate thickness than the other plate members.

4. The electromagnetic clutch according to claim 1, wherein from among said plate members, said plate member that contacts the end face of the driving rotor is thicker than the other plate members.

5. An electromagnetic clutch according to claim 1, wherein said driving rotor has a main body portion formed in a unitary manner and a wall portion that forms said end face of said driving rotor.

6. An electromagnetic clutch according to claim 5, wherein said plate members are ring-shaped and formed of a metal material, and are fixed in place to the outer periphery of the main body portion by welding at a plurality of sites on the outer periphery of said plate members or by caulking at sites on the outer periphery of the end face of said plate members, and/or are fixed in place to the inner periphery of the main body portion by welding at a plurality of sites on the inner periphery of said plate members or by caulking at sites on the inner periphery of the end face of said plate members.

7. An electromagnetic clutch according to claim 5, wherein said wall portion comprises a plurality of plate members laminated together, and at least a part of each of said plate members being connected to the other plate members.

8. A compressor for compressing a fluid by a compressing element, wherein the power from a driving source that is mechanically connected to said driving rotor via an electromagnetic clutch according to claim 5 is transmitted to the drive shaft of said compressor element which is mechanically connected to said armature.

9. An electromagnetic clutch comprising an armature that has a driving rotor, which is connected so as to be linked to a driving source and which includes a coil, and an armature plate, which is disposed so as to face said driving rotor and which has the same rotational axis thereas, and an end face of said driving rotor and said armature plate are attached or separated by said coil's magnetic force when a voltage is applied to excite said coil thereby intermittently coupling said driving rotor and said armature, wherein said armature plate comprises a plurality of plate members laminated together, and at least a part of each of said plate member being connected to the other plate members, wherein said plate members forming said armature plate are roughly ring-shaped and made of metal, and are fixed in place by welding at a plurality of sites at the outer periphery of said plate members, or at the outer and inner peripheries of said plate members.

10. The electromagnetic clutch according to claim 9, wherein each said plate member has the same thickness.

11. The electromagnetic clutch according to claim 9, wherein from among said plate members, said plate member that contacts the end face of said driving rotor has a different plate thickness than the other plate members.

12. The electromagnetic clutch according to claim 9, wherein from among said plate members, said plate member that contacts the end face of said driving rotor is thicker than the other plate members.

13. An electromagnetic clutch according to claim 9, wherein said driving rotor has a main body portion formed in a unitary manner and a wall portion that forms said end face of said driving rotor.

14. An electromagnetic clutch according to claim 13, wherein said plate members are ring-shaped and formed of a metal material, and are fixed in place to the outer periphery of the main body portion by welding at a plurality of sites on the outer periphery of said plate members or by caulking at sites on the outer periphery of the end face of said plate members, and/or are fixed in place to the inner periphery of the main body portion by welding at a plurality of sites on the inner periphery of said plate members or by caulking at sites on the inner periphery of the end face of said plate members.

15. An electromagnetic clutch according to claim 13, wherein said wall portion comprises a plurality of plate members laminated together, and at least a part of each of said plate members being connected to the other plate members.

16. A compressor for compressing a fluid by a compressing element, wherein the power from a driving source that is mechanically connected to said driving rotor via an electromagnetic clutch according to claim 13 is transmitted to the drive shaft of said compressor element which is mechanically connected to said armature.

17. An electromagnetic clutch comprising an armature that has a driving rotor, which is connected to be linked to a driving source and which includes a coil, and an armature plate, which is disposed to face said driving rotor and which has the same rotational axis thereas, and an end face of said driving rotor and said armature plate are attached or separated by said coil's magnetic force when a voltage is applied to excite said coil thereby intermittently coupling said driving rotor and said armature, wherein said armature plate comprises a plurality of plate members made of a uniform material laminated together.

18. The electromagnetic clutch according to claim 17, wherein each said plate member has the same thickness.

19. The electromagnetic clutch according to claim 17, wherein from among said plate members, said plate member that contacts the end face of said driving rotor has a different plate thickness than the other plate members.

20. The electromagnetic clutch according to claim 17, wherein from among said plate members, said plate member that contacts the end face of said driving rotor is thicker than the other plate members.

21. An electromagnetic clutch according to claim 17, wherein said driving rotor has a main body portion formed in a unitary manner and a wall portion that forms said end face of said driving rotor.

22. An electromagnetic clutch according to claim 21, wherein said plate members are ring-shaped and formed of a metal material, and are fixed in place to the outer periphery of the main body portion by welding at a plurality of sites on the outer periphery of said plate members or by caulking at sites on the outer periphery of the end face of said plate members, and/or are fixed in place to the inner periphery of the main body portion by welding at a plurality of sites on the inner periphery of said plate members or by caulking at sites on the inner periphery of the end face of said plate members.

23. An electromagnetic clutch according to claim 21, wherein said wall portion comprises a plurality of plate members laminated together, and at least a part of each of said plate members being connected to the other plate members.

24. A compressor for compressing a fluid by a compressing element, wherein the power from a driving source that is mechanically connected to said driving rotor via an electromagnetic clutch according to claim 21, is transmitted to the drive shaft of said compressor element which is mechanically connected to said armature.

25. An electromagnetic clutch comprising an armature that has a driving rotor, which is connected to be linked to a driving source and which includes a coil, and an armature plate, which is disposed to face said driving rotor and which has the same rotational axis thereas, and an end face of said driving rotor and said armature plate are attached or separated by said coil's magnetic force when a voltage is applied to excite said coil thereby intermittently coupling said driving rotor and said armature, wherein said armature plate comprises a plurality of plate members with air layers being formed between said plate members and said plate members laminated together.

26. The electromagnetic clutch according to claim 25, wherein each said plate member has the same thickness.

27. The electromagnetic clutch according to claim 25, wherein from among said plate members, said plate member that contacts the end face of said driving rotor has a different plate thickness than the other plate members.

28. The electromagnetic clutch according to claim 25, wherein from among said plate members, said plate member that contacts the end face of said driving rotor is thicker than the other plate members.

29. An electromagnetic clutch according to claim 25, wherein said driving rotor has a main body portion formed in a unitary manner and a wall portion that forms said end face of said driving rotor.

30. An electromagnetic clutch according to claim 29, wherein said plate members are ring-shaped and formed of a metal material, and are fixed in place to the outer periphery of the main body portion by welding at a plurality of sites on the outer periphery of said plate members or by caulking at sites on the outer periphery of the end face of said plate members, and/or are fixed in place to the inner periphery of the main body portion by welding at a plurality of sites on the inner periphery of said plate members or by caulking at sites on the inner periphery of the end face of said plate members.

31. An electromagnetic clutch according to claim 29, wherein said wall portion comprises a plurality of plate members laminated together, and at least a part of each of said plate members being connected to the other plate members.

32. A compressor for compressing a fluid by a compressing element, wherein the power from a driving source that is mechanically connected to said driving rotor via an electromagnetic clutch according to claim 29 is transmitted to the drive shaft of said compressor element which is mechanically connected to said armature.

33. An electromagnetic clutch comprising an armature that has a driving rotor, which is connected to be linked to a driving source and which includes a coil, and an armature plate, which is disposed to face said driving rotor and which has the same rotational axis thereas, and an end face of said driving rotor and said armature plate are attached or separated by said coil's magnetic force when a voltage is applied to excite said coil thereby intermittently coupling said driving rotor and said armature, wherein said armature plate comprises a plurality of plate members laminated together, and at least a part of each of said plate members being connected to the other said plate members, wherein said plate members forming said armature plate are roughly ring-shaped and made of metal.

34. The electromagnetic clutch according to claim 33, wherein each said plate member has the same thickness.

35. The electromagnetic clutch according to claim 33, wherein from among said plate members, said plate member that contacts the end face of said driving rotor has a different plate thickness than the other plate members.

36. The electromagnetic clutch according to claim 33, wherein from among said plate members, said plate member that contacts the end face of said driving rotor is thicker than the other plate members.

37. An electromagnetic clutch according to claim 33, wherein said driving rotor has a main body portion formed in a unitary manner and a wall portion that forms said end face of said driving rotor.

38. An electromagnetic clutch according to claim 37, wherein said plate members are ring-shaped and formed of a metal material, and are fixed in place to the outer periphery of the main body portion by welding at a plurality of sites on the outer periphery of said plate members or by caulking at sites on the outer periphery of the end face of said plate members, and/or are fixed in place to the inner periphery of the main body portion by welding at a plurality of sites on the inner periphery of said plate members or by caulking at sites on the inner penphery of the end face of said plate members.

39. An electromagnetic clutch according to claim 37, wherein said wall portion comprises a plurality of plate members laminated together, and at least a part of each of said plate members being connected to the other plate members.

40. A compressor for compressing a fluid by a compressing element, wherein the power from a driving source that is mechanically connected to said driving rotor via an electromagnetic clutch according to claim 37 is transmitted to the drive shaft of said compressor element which is mechanically connected to said armature.

* * * * *